United States Patent Office 3,375,324
Patented Mar. 26, 1968

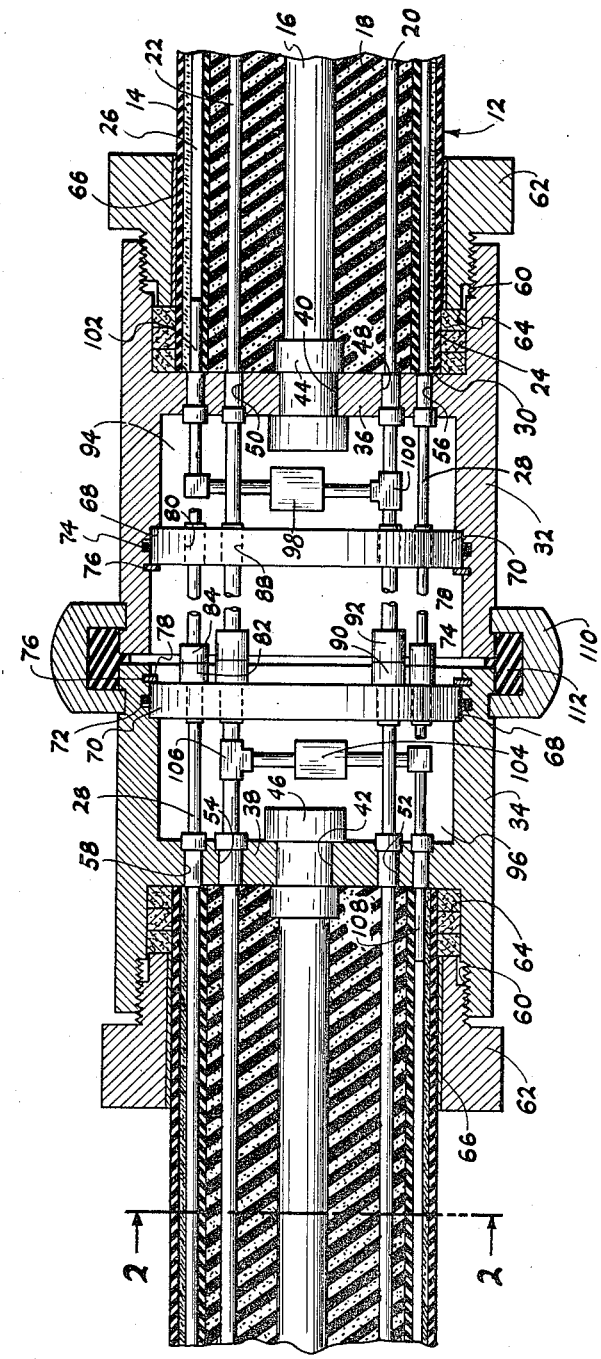

3,375,324
PRESSURE CABLE
Sheldon Martin Miller, 1403 E. 5th Court,
Tulsa, Okla. 74120
Filed Oct. 23, 1965, Ser. No. 503,109
6 Claims. (Cl. 174—101.5)

This invention relates to improvements in cable structures and more particularly, but not by way of limitation, to a pressure cable particularly designed and constructed for an automatic control of the buoyancy thereof in operations wherein a cable is utilized in underwater applications.

There are many operations wherein an electric cable, or the like, is submerged in water and it is desirable to maintain the cable at a preselected depth in the water. For example, in certain seismograph operations it is common practice to dispose a plurality of geophones in spaced relationship under water in order to obtain certain desired information. The geophones, detectors, or seismographs are usually spaced along or carried in spaced relation by means of seismic cable which is towed along through the water by means of suitable vessel. The seismometers or detectors are pressure sensitive instruments and they are usually not all equally sensitive at all pressures. It will thus be apparent that it is desirable to maintain the pressure surrounding the geophones or detectors substantially equal in order to obtain the most accurate results.

As a practical matter it has been found desirable to construct the seismic or detecting cable which carries the geophones from a plurality of connected cable sections with each cable section being approximately one hundred feet in length. The cable sections are preferably of a construction to be neutrally buoyant at about twenty to thirty feet of depth in the water. However, since the specific gravity of water, and particularly sea water, changes with variations in mineral content, salinity, temperature or other factors, it is difficult to provide a cable having the desirable buoyant characteristics.

In an effort to achieve the buoyancy desired, one such detecting cable as in use today for this type of operation is provided with oil, or other fluid therein, in such a manner that the fluid may be drained out of or removed from the interior of the cable, or added to the interior thereof in order to change the buoyancy of the cable. This has proven to be extremely expensive and time consuming and, in fact, often proves to be prohibitive in cost.

The present invention contemplates a novel pressure cable wherein each section of cable may be maintained at a preselected sensitive or pressure responsive system. The novel cable comprises a plurality of cable sections coupled together to provide the desired length for the entire cable. Each cable section is initially constructed in a manner to provide any desired natural buoyancy for the cable, and in addition is provided with automatic means for altering the buoyancy or changing the specific gravity thereof in accordance with external pressure changes. In the event the cable in any cable section drops or sinks within the water to a depth below the desired limits therefor, a pressure responsive or pressure differential control valve is actuated for automatically permitting or directing a pressure fluid into the voids provided in the interior of the cable sections. This fluid is preferably an oil having a specific gravity less than the specific gravity of the water, and as the fluid enters the cable, the outer jacket of the cable or cable section is expanded or ballooned, and the specific gravity of the cable or affected cable section is decreased. As a result the cable will rise within the water until the cable reaches the preselected depth therefor. When the predetermined depth is reached, the valve is automatically closed, and the cable is maintained in the stable condition for remaining at this depth until the conditions of the surrounding water change sufficiently whereby the buoyancy of the cable therein is affected.

Conversely, if the cable rises or elevates within the water to a depth above the predetermined limits therefor, a second pressure responsive or pressure differential control valve is actuated for withdrawing fluid from the cable to increase the specific gravity of the cable. The cable will then drop or sink in the water until it reaches the predetermined depth, at which point the second valve will be closed in order to maintain the cable at this depth. The pressure responsive valves are preferably of the type having a pressure differential responsive diaphragm with the diaphragm being utilized for sensing the pressure of the oil or fluid within the cable. However, it is to be understood that the direct pressure of the surrounding water may be utilized for the operation of the valves to control buoyancy of the cable by changing the specific gravity thereof.

Whereas the particular example hereinbefore set forth relates to seismic operations, it is to be understood that there is no intention to limit the cable structure to any particular underwater use. There are many fields of operation in which the cable may be utilized. By way of further illustration, the cable could also be utilized in military operations, such as for suspending an object from a submarine, or the like, for facilitating scanning of the surrounding waters, or the like.

It is an important object of this invention to provide a novel pressure cable particularly designed and constructed for automatically controlling the buoyancy thereof.

Another object of this invention is to provide a novel pressure cable wherein the buoyancy thereof is controlled by changing the specific gravity of the cable.

Still another object of this invention is to provide a novel pressure cable wherein the specific gravity thereof is automatically changed in accordance with variations in external pressures acting on the cable.

A further object of this invention is to provide a novel pressure cable wherein the buoyancy of each cable section is automatically controlled independently from the remaining cable sections.

A further object of this invention is to provide a novel pressure cable which is simple and efficient in operation and economical and durable in construction.

Other objects and advantageous features of the present invention will hereinafter more fully appear in connection with a detailed description of the drawings in which.

FIGURE 1 is a broken sectional view of the abutting end portions of a pair of cable sections embodying the invention.

FIGURE 2 is a sectional view taken on line 2—2 of FIGURE 1.

FIGURE 3 is an elevational view depicting a pressure cable in an underwater operation.

Referring to the drawings in detail, reference character 10 generally indicates a cable comprising a plurality of cable sections 12 secured in tandem relation, as will be hereinafter set forth. Each cable section 12 is substantially identical and the particular embodiment depicted herein comprises an outer sleeve 14 having a centrally disposed stress member 16 extending longitudinally therethrough. The outer sleeve 14 is preferably constructed of a suitable resilient or yieldable material, such as a rubber compound, plastic, or the like, and the stress member 16 may be constructed of any suitable well known material, such as a plastic or steel rope, or the like, or any rigid or high tensile material but not limited thereto. The annular space surrounding the stress member 16 may be filled with or comprise an expanded polyethylene sleeve 18 having a pair of diametrically opposed fluid lines 20 and 22 extending longitudinally therethrough. Whereas the lines 20 and 22 as depicted herein extend substantially parallel with respect to the stress member 16, it is to be understood that the lines 20 and 22 may be spirally disposed around the outer periphery of the member 16, if desired, or otherwise disposed within the sleeve 18 in order to reduce stiffness in the cable structure.

A sealing sleeve 24 is disposed around the outer periphery of the sleeve 18, and, if desired, the sleeve 24 may be relatively thin in cross section. The sleeve 24 may be constructed from a suitable rubber or plastic for sealing around the outer periphery of the sleeve 18 for a purpose as will be hereinafter set forth. An annular space 26 surrounds the sleeve 24 for receiving a plurality of longitudinally extending electrical conductors 28, as is well known in cables of this type. An open weave binder sleeve 30 surrounds the outer cylindrical configuration formed by the outer peripheries of the conductors 28, and is disposed adjacent the inner periphery of the outer sleeve 14.

Substantially identical coupling members 32 and 34 are provided at the opposed ends of each cable section 12. The couplings 32 and 34 are preferably of a substantially cylindrical configuration and are provided with an internal web or plate 36 and 38, respectively. Each plate 36 and 38 is provided with a central bore 40 and 42, respectively, for receiving the opposite ends of the central stress member 16 therethrough. The stress member 16 may be secured to the plates 36 and 38 in any suitable manner, such as by the connection members 44 and 46. In addition, suitable sealing means (not shown) may be provided for precluding leakage of fluid around the connection members 44 and 46, as is well known. The plate 36 is further provided with a pair of diametrically opposed apertures 48 and 50 for receiving one end of the lines 20 and 22, respectively, and the plate 38 is similarly provided with a pair of apertures 52 and 54 for receiving the opposite ends of the lines 20 and 22 therethrough. The lines 20 and 22 may be secured within the respective aperture in any well known suitable manner, and provided with sealing means (not shown) for precluding leakage of fluid therearound. The lines 20 and 22 extend longitudinally beyond the plates 36 and 38 for a purpose as will be hereinafter set forth.

A plurality of circumferentially spaced apertures 56 are provided in the plate 36 whereby each aperture 56 receives one end of a conductor 28 therethrough, with the respective conductor being secured in the respective aperture in any well known manner, and sealed for precluding leakage of fluid therearound. Similarly, a plurality of circumferentially spaced apertures 58 are provided in the plate 38 whereby each aperture 58 receives the opposite end of a conductor 28 therethrough, with the respective conductor being secured in the respective aperture in any well known manner, and sealed against leakage of fluid therearound.

One end of each of the couplings 32 and 34 is provided with an internally threaded portion 60, each for receiving a follower or packing gland member 62 therein. A plurality of annular sealing members 64 are interposed between the plates 36 and 38 and the respective follower member 62 whereby leakage of fluid from the exterior of the cable 10 to the interior thereof is precluded. It is preferable to interpose a bushing or sleeve 66 between the followers 62 and the outer periphery of the cable section 12 in order to preclude undue wear on the outer periphery of the cable as the followers 62 are rotated with respect thereto for any reason, such as for increasing the pressure against the packing members 64.

The opposite end of each coupling member 32 and 34 is provided with an inwardly directed annular shoulder 68 spaced from the open end thereof for receiving a removable disc or plate 70 thereagainst, as particularly shown in FIGURE 1. An annular groove 72 is provided on the inner periphery of each coupling 32 and 34 and spaced slightly from the shoulder 68 to receive a sealing ring 74. A second annual groove 76 is spaced from each groove 72 for receiving a suitable lock washer 78 which retains the plate 70 in position against the shoulder 68, as is well known.

Each plate 68 is provided with a plurality of circumferentially spaced apertures 80 for receiving the conductors 28 therethrough, as is well known. The opposite ends of each conductor 28 are provided with suitable mating quick coupling connection members 82 and 84 for facilitating connection between adjacent cable sections whereby a continuous conductor is provided extending throughout the length of the connected cable sections 12. In addition, each plate 68 is provided with a pair of diametrically opposed apertures 86 and 88 for receiving the lines 20 and 22, respectively, therethrough. The opposite ends of the lines 20 and 22 are each provided with suitable mating quick coupling connection members 90 and 92 for facilitating connection between adjacent sections of the flow line to provide continuous fluid lines extending throughout the length of the connected cable sections 12.

From an inspection of FIGURE 1 it will be apparent that one of the quick coupling members of each mating pair may be disposed adjacent the outer or exposed face of one plate 68 whereas the mating portion thereof may be spaced from the face of the other plate 68 by the length of the line or conductor carrying the particular coupling member. This will facilitate the connection between adjacent cable sections 12, as will be hereinafter set forth in detail.

A sealed chamber 94 is provided between the web or plate 36 and the associated disc 70 at one end of each cable section 12, and a similar sealed chamber 96 is provided between the web 38 and the associated plate 70 at the opposite end of each cable section 12. At least one orifice or port (not shown) is provided in each web 36 and 38 in order to maintain the pressure in the chambers 94 and 96 equal to the pressure in the annular chamber 26. A suitable pressure differential or pressure responsive check valve 98 is interposed in the flow line 20 by means of a suitable fitting 100, and is disposed in the chamber 94. A conduit 102 extends from the valve 98 through the plate or web 36 and into open communication with the annular space 26. Of course, suitable sealing means (not shown) is provided for precluding leakage of fluid around the conduit 102 extending through the plate 36. The valve 98 may be of any suitable type, and in the embodiment depicted herein is preferably provided with an internal diaphragm (not shown) responsive to pressure differentials in the chamber 94 for opening the valve 98 upon an increase in the pressure in the chamber 26 in order to direct fluid from the line 20 into the annular chamber 26 for a purpose as will be hereinafter set forth.

A similar pressure differential or pressure responsive valve 104 is connected with the line 22 by means of a suitable connection member 106 and is disposed within the chamber 96. A conduit 108 extends from the valve 104 through the web 38 and into open communication with the annular space 26. Whereas the valve 104 may be of any suitable type, for the present embodiment of the invention it is preferred that the valve 104 be provided with an internal diaphragm (not shown) which is responsive to pressure differentials in the chamber 96 for opening the valve 104 upon a decrease in pressure in the chamber 26 in order to drain fluid from the annular space 26 to the line 22 for a purpose as will be hereinafter set forth. Of course, it is to be noted that a single valve of a suitable type may be utilized in lieu of the two valves 98 and 104 depicted herein, if desired, in order to accomplish the combined operations of the two valves.

The coupling members 32 and 34 of adjacent or abutting cable sections 12 may be connected in end to end or tandem relation in any suitable manner, such as a split type or victolic coupling 110 having a sealing member 112 to provide a seal at the juncture or joint between the two cable sections. Coupling members for securing cables of this general type in end to end relation are well known, and any suitable type may be utilized in order to interconnect the necessary number of cable sections 12 in end to end relation for providing a cable 10 of the desired length.

The cable 10 may be carried by or towed through the water, indicated at 114 in FIGURE 3, by a suitable vessel 116. It is general practice to provide a suitable sheave or pulley 118 on the vessel 116 for facilitating reeling or unreeling of the cable and handling thereof during a towing operation. In addition, a suitable fluid reservoir 120 may be provided on the vessel 116 for supplying fluid to the lines 20 and 22. Of course, suitable pressure regulating devices (not shown) may be utilized in conjunction with the fluid reservoir for maintaining or controlling the pressure of the fluid being supplied to the appropriate fluid line. Each fluid line 20 and 22 is preferably in communication with the fluid reservoir in order that the fluid may be recirculated through the cable 10 during operation thereof, as will be hereinafter set forth. Of course, individual reservoir or supply vessels may be provided for each line 20 and 22, if desired.

Whereas the particular embodiment of the cable 10 depicted herein provides a centrally disposed stress member 16 extending through each cable section 12 and being surrounded with a sleeve 18 having the conductors 28 extending longitudinally around the outer periphery thereof, it is to be noted that the layers of the cable may be reversed or rearranged in any desired manner. For example, the stress member may be in the form of an annular sleeve with the expanded plastic body, or the equivalent thereof, disposed within the interior of the stress sleeve. There is no intention to limit the interior construction of the cable to the exact arrangement depicted herein. In addition, the material from which the sleeve 18 is constructed may be selected in order to provide substantially any desired natural buoyancy or specific gravity for the cable sections.

*Operation*

When a cable for any operation is desired wherein the buoyancy of the cable may be controlled, a plurality of the cable sections 12 may be connected in tandem relation to provide a cable 10 of the desired length for performing the necessary function or operation. In order to connect adjacent section 12, the coupling member 34 of one cable section and the coupling member 32 of a second cable section may be connected by connecting the mating quick coupling members 90 and 92 of each of the lines 20 and 22 and similarly connecting the mating quick coupling members 82 and 84 of the conductors 28. It will be apparent that the length of the conductors 28 and lines 20 and 22 provided in the end of the coupling 32 will facilitate handling and connecting of the mating quick coupling members prior to a meeting of the adjacent ends of the complementary couplings 32 and 34 being coupled together. Subsequent to the connection of all the conductors 28 and lines 20 and 22, the couplings 32 and 34 may be secured together in substantial axial alignment by the coupling member 110, as is well known.

When the plurality of cable sections 12 have been connected together, the cable 10 will be provided having a plurality of conductors 28 extending longitudinally throughout the length thereof to provide an electrical connection with a detecting device (not shown), or other equipment being utilized in connection with the cable 10, as is well known. In addition, the fluid lines 20 and 22 will extend longitudinally throughout the length of the cable 10 for directing the fluid to each cable section 12.

As hereinbefore set forth, the cable sections 12 are constructed at a preselected natural buoyancy or specific gravity whereby the cable 10 will float in the water 114 at the desired depth. As a practical matter it is usually found to be desirable to secure a buoy such as shown at 122 in the proximity of the outer end of the cable 10 in order to support and mark the location of the cable in the event the cable is accidentally severed. Of course, a plurality of buoys may be provided along the length of the cable, if desired, for supporting and marking the locations of any portions of the cable due to accidental severing thereof, as is well known.

When the density or specific gravity of the water through which the cable 10 is moving changes or if the cable lowers or raises within the water for any reason to a depth beyond the desirable depth limits desired, the affected cable sections will be automatically raised or lowered to reposition the cable at the desired depth. When the cable or any cable section sinks within the water to a depth below the lowermost limit therefor, the external pressure acting on the outer periphery of the outer jacket 14 of any affected cable section 12 will increase, thus tending to urge the jacket radially inwardly, and increasing the pressure within the annular chamber 26. This increased pressure is transmitted to the chamber 94 and respective valve 98 and opens the valve whereby fluid from the line 20 is directed through the conduit 102 into the voids around the conductors 28 disposed within the annular space 26. The fluid flowing into the annular chamber 26 causes the outer jacket 14 to expand radially outward, thus increasing the volume of water being displaced by the cable sections, and since the specific gravity of the fluid or oil introduced into the chamber 26 is less than the specific gravity of the surrounding water, the affected cable sections will rise within the water until the desired depth limit is reached. When the cable rises sufficiently within the water, the external pressure acting on the jacket 14 decreases with a resulting decrease in internal pressure in the chamber 26, whereupon the valve 98 will close and trap the fluid in the chamber 26. The cable sections will then remain at the desired elevation or depth within the water until the surrounding conditions change sufficiently for causing the cable to either raise or lower.

In the event the cable or any sections thereof rise within the water to a depth less than the desired upper limits therefor, the external pressure acting on the outer jackets 14 of any affected cable sections will be decreased whereby the outer jackets 14 will expand radially outwardly with a resultant decrease in the pressure within the chamber 26. This decrease in pressure is transmitted to the chamber 96 for opening of the valve 104. The fluid in the chamber 26 is drained or withdrawn therefrom through the conduit 108 and through the valve 104 and directed to the line 22. This permits the outer jacket 14 to retract in a radial direction, and the overall result is an increase in the specific gravity of the affected cable sections. Thus, the cable or affected sections thereof will sink within the water until the external pressures acting thereon increase sufficiently for increasing the pressure within the annular chamber sufficiently for closing of the valve 104 and precluding the withdrawal of any additional fluid from the chamber 26. The cable will remain in this relative position within the water until the conditions thereof alter, as hereinbefore set forth.

Of course, the sealing sleeve 24 precludes leakage of the fluid from the chamber 26 into the sleeve or body 18. In addition, the line 20 is supplied with the fluid from the fluid reservoir 120 and is maintained under sufficient pressure for forcing the fluid into the annular chamber 26 when any of the valves 98 are open. The fluid discharged into the line 22 from any of the valves 104 which are opened is directed back to the reservoir 120. The reservoir may be provided with separate compartments, with at least one compartment for storing the fluid under pressure for supply to the line 20, and at least one compartment for receiving the fluid from the line 22, which is normally at a reduced pressure. As hereinbefore set forth, suitable pressure regulating devices may be utilized for increasing the pressure of the returned fluid and directing the repressured fluid into the storage container for the high pressure fluid in order to provide a recirculation of the fluid during operation of the cable.

In the event any cable section 12 becomes damaged for any reason, the damaged cable section may be easily removed and replaced without draining any fluid from the fluid flow lines. The quick coupling members connecting the conductors and fluid flow lines may be quickly and easily disconnected to permit removal of the damaged section, and the new section may be quickly installed in lieu thereof. It is preferable that the quick coupling members 90 and 92 be of any well known self closing type having means for closing thereof in the disconnected position to preclude loss of fluid from the lines 20 and 22 during the replacing operation.

From the foregoing it will be apparent that the present invention provides a novel pressure cable wherein the buoyancy or specific gravity thereof is automatically controlled to maintain the cable within preselected depth limits in a body of liquid, or fluid. The novel cable comprises a plurality of independently controlled sections having a high pressure and low pressure line extending longitudinally therethrough. In the event any cable section sinks within the water, or other fluid, to a depth lower than the desired limits therefor, a valve in the high pressure line is automatically opened to inject a fluid into the affected cable section whereby the outer jacket is expanded, and the specific gravity of the section is reduced in order that the section will rise within the water. Conversely, if the cable rises within the water to a height greater than the desired limits therefor, a valve to the low pressure line is automatically opened for withdrawing the fluid from the interior of the cable whereby the outer jacket may contract and the specific gravity of the cable section is increased in order that the cable section will sink in the water. Thus, the cable is automatically maintained within the desired limits of depth under the water or other fluid surrounding the cable. The novel cable is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

What is claimed is:

1. A pressure cable comprising yieldable outer jacket means, internally disposed body means of a preselected specific gravity, high pressure flow line means extending through the cable, low pressure flow line means extending through the cable, internal chamber means provided conterminous with the outer jacket means, means interposed between the high pressure flow line means and the internal chamber means for automatically directing a fluid into the chamber upon an increase in external pressure surrounding the outer jacket to reduce the specific gravity of the cable, and means interposed between the low pressure flow line means and the internal chamber means for automatically withdrawing a portion of the fluid from the chamber upon a decrease in external pressure surrounding the outer jacket to increase the specific gravity of the cable.

2. A pressure cable comprising a plurality of cable sections connected in tandem relation, each of said cable sections having an internal chamber means and means provided in each cable section for automatically controlling the specific gravity thereof by introducing fluid into and removing fluid from the said chamber means in response to the external pressure on said cable section to maintain a predetermined buoyancy for the cable sections within a surrounding fluid.

3. A pressure cable comprising a plurality of cable sections connected in tandem relation, coupling means for connecting the cable sections in said tandem relation, fluid pressure flow line means provided in each cable section, an internal chamber provided in each cable section for alternately receiving and discharging a fluid, and means interposed between the pressure flow line means and the internal chamber for alternately directing the fluid to the chamber and withdrawing a portion of the fluid therefrom to control the specific gravity of each cable section.

4. A pressure cable comprising a plurality of substantially identical cable sections connected in tandem relation, each of said cable sections comprising a yieldable outer jacket, stress means extending longitudinally throughout the length thereof, a body member provided for each cable section to provide a preselected specific gravity therefor, an internal chamber provided in communication with the outer jacket, and means for alternately injecting and withdrawing a fluid into the chamber for alternately decreasing and increasing the specific gravity of each cable section independently of the remaining cable sections.

5. A pressure cable as set forth in claim 4 wherein the last mentioned means comprises valve means automatically operable upon variation of the external pressures acting on each cable section.

6. A pressure cable comprising a plurality of substantially identical cable sections secured in tandem relation, each of said cable sections comprising a yieldable outer jacket, stress means extending longitudinally through the length thereof, a body member provided within the jacket member to provide a preselected specific gravity for the cable section, fluid passageway means extending through the cable section, an internal chamber in communication with the inner periphery of the outer jacket, first valve means interposed between the fluid passageway means and the internal chamber for automatically injecting a fluid into the chamber upon an increase in external pressure acting on the cable section for decreasing the specific gravity of the cable section, and second valve means interposed between the fluid passageway means and the internal chamber for automatically withdrawing a portion of the fluid from the internal chamber upon a decrease in external pressure acting on the cable section for increasing the specific gravity of the cable section.

References Cited
UNITED STATES PATENTS

| | | | |
|---|---|---|---|
| 1,363,958 | 12/1920 | Dalen | 102—14 |
| 2,825,039 | 2/1958 | Schurman | 174—101.5 |

LARAMIE E. ASKIN, *Primary Examiner.*

E. GOLDBERG, *Assistant Examiner.*